(12) United States Patent
Lewis

(10) Patent No.: US 6,667,572 B2
(45) Date of Patent: Dec. 23, 2003

(54) IMAGE DISPLAY APPARATUS USING NANOTUBES AND METHOD OF DISPLAYING AN IMAGE USING NANOTUBES

(75) Inventor: Howard D. Lewis, Arlington, TN (US)

(73) Assignee: Brother International Corporation, Bridgewater, NJ (US)

( * ) Notice: Subject to any disclaimer, the term of this patent is extended or adjusted under 35 U.S.C. 154(b) by 130 days.

(21) Appl. No.: 09/988,760

(22) Filed: Nov. 20, 2001

(65) Prior Publication Data

US 2003/0094898 A1 May 22, 2003

(51) Int. Cl.[7] ................................................. H01J 1/34
(52) U.S. Cl. .................... 313/524; 313/531; 313/311
(58) Field of Search ............................... 313/523, 524, 313/531, 539, 540, 542, 110, 311; 315/99; 359/15

(56) References Cited

U.S. PATENT DOCUMENTS

| 6,019,656 A |  | 2/2000 | Park et al. |  |
| 6,400,088 B1 | * | 6/2002 | Livingston et al. | ........... 315/94 |
| 2003/0052006 A1 | * | 3/2003 | Noca et al. | ................. 204/450 |

OTHER PUBLICATIONS

Z. F. Ren et al., "Synthesis of Large Arrays of Well–Aligned Carbon Nanotubes on Glass", Science vol. 282, Nov. 6, 1988, pp. 1105–1107.
Shoushan Fan et al., "Self–Oriented Regular Arrays of Carbon Nanotubes and Their Field Emission Properties", Science vol. 283, Jan. 22, 1999, pp. 512–514.
Mele, E.J. et al.; *Physical Review* B; 61(11); (2000).

* cited by examiner

Primary Examiner—Nimeshkumar D. Patel
Assistant Examiner—Karabi Guharay
(74) Attorney, Agent, or Firm—Oliff & Berridge, PLC

(57) ABSTRACT

An image display apparatus includes a nanotube assembly having a plurality of nanotubes arranged in an array. An optical excitation device is provided adjacent to the nanotube assembly. The optical excitation device includes a diffraction grating and a piezoelectric crystal disposed adjacent to the diffraction grating. A radiation source generates a write beam incident to the piezoelectric crystal, a read beam incident to the diffraction grating, and an erase beam incident to the diffraction grating. When voltage is applied to the piezoelectric crystal, the write beam scans across the diffraction grating and forms a grating pattern in the diffraction grating. The read beam reads the grating pattern as a holographic image on the at least one nanotube. The erase beam erases the grating pattern.

18 Claims, 4 Drawing Sheets

IMAGE DISPLAY APPARATUS USING NANOTUBES AND METHOD OF DISPLAYING AN IMAGE USING NANOTUBES

BACKGROUND OF THE INVENTION

1. Field of Invention

This invention relates to carbon nanotubes and image display devices using carbon nanotubes.

2. Description of Related Art

Nanotechnology is the study of devices that operate at the nanometer ($10^{-9}$ m) scale. The possible uses for this technology are wide-ranging, from medical applications to various application in computing and consumer electronics. However, these structures present challenging technical issues, such as how to control them, and how to construct them by using macroscopic design principles in a realm in which classical approaches are not always useful.

Carbon nanotubes are a recent development in the field of nanotechnology. Carbon nanotubes, like diamond or graphite, are a variant from of crystalline carbon, structurally related to the carbon fullerene "buckyball" or $C_{60}$. Instead of a ball shape, the carbon nanotube structure takes the form of a long tube of graphene hexagons capped at each end by a fullerene hemisphere. The nanotubes can be either single or multi-walled. Multi-walled tubes contain multiple layers of concentric tubes.

The conductive properties of nanotubes depend on the exact helical structure of the nanotubes. The three groupings of helical structure of carbon nanotubes are "armchair", "zigzag" and "chiral". Armchair nanotubes are metallic. Zigzag and chiral nanotubes can be either semiconducting or metallic, depending on the particular properties of its lattice parameters. A single-walled carbon nanotube typically has a width of 1.2 to 1.4 nm and a length of up to 10 $\mu$m, depending on production and purification methods.

In order to better understand the properties of nanotubes, it is helpful to look at the properties of a graphene sheet and imagine a segment of it rolled into a tube. FIG. 1 shows a segment 10 of a graphene sheet. The nanotube is made by connecting vertices 20 on one of the dotted lines shown in FIG. 1 with its counterpart on the other dotted line. The direction of the tube axis T along the segment 10 determines the conductive properties of the nanotube. The direction of the tube axis T is usually described in terms of a chiral vector C that is perpedicular to the tube axis T. The chiral vector C is typically written as (n,m), where n and m are integers. The integers n and m are related to the chiral vector C as follows:

$$C = na_1 + ma_2 \quad (1)$$

where:

$a_1$ and $a_2$ are the two lattice unit vectors.

The parameters n and m determine the width and helicity of the nanotube. Further, a tube is metallic if n−m is a multiple of three, otherwise it is semiconducting.

FIG. 2 shows the relationship between armchair, zigzag and chiral tubes. For armchair tubes, the chiral vector $C_a$ is described as (n,n). For zigzag tubes, the chiral vector $C_z$ is described as (n,0). All other tubes are chiral tubes.

The conductive properties of nanotubes arise from the unique hexagonal structure of graphene. Twisting or bending a tube can change its electrical properties from metallic to semiconducting, or vice-versa. Also, applying a magnetic field parallel to a nanotube axis can change its conduction properties.

Nanotubes, like diamond and in-plane graphene, are very strong and resist pressure well. A nanotube can absorb large amounts of force without bending, and after a critical amount of force is applied, the nanotube bends rather than shatters.

Nanotubes were first produced by using a carbon anode in an electrical arc that vaporized the carbon and deposited the tubes as a mass of tangled ropes. Other processes have been developed, such as laser ablation, most of which use catalysts such as Ni. Currently, no regular means exists for controlling the length or the helical properties of nanotubes produced using these methods. However, it has been shown that using catalysts can enhance production of single-walled versus multi-walled tubes.

For many applications, the ability to form regular arrays of nanotubes on a substrate is required. Shoushan Fan et al., "Self-Oriented Regular Arrays of Carbon Nanotubes and Their Field Emission Properties", *Science*, pp. 512–514 (1999) describes a method for forming arrays of nanotubes on a substrate. This method includes etching holes in a Si substrate and using a Fe mask to create a pattern. The nanotubes are then grown using chemical vapor deposition (CVD), and bundles of tubes align themselves in a regular pattern. A similar method, presented in Z. F. Ren et al., "Synthesis of Large Arrays of Well-Aligned Carbon Nanotubes on Glass", *Science*, pp. 1105–1107 (1998), involves using acetylene and ammonia, and a glass substrate covered with a layer of nickel catalyst.

The size and unique properties of carbon nanotubes make them ideal candidates for use in many different nanotechnology applications. Much of the current work on nanotubes focuses on production methods and the use of nanotubes as nanometer-sized wires and uniform field-emission devices. For example, U.S. Pat. No. 6,019,656 describes a cold-cathode field emitter method for use in a display device. This device uses a voltage differential to cause an electron field emission from the array of nanotubes.

Other methods have been developed that generate a current in a nanotube or nanotube array. For example, a current can be generated in a nanotube by a pair of laser beams, wherein the wavelength of one laser beam is double the other. Altering the relative phase of the two beams controls the direction of the induced current. This approach is presented in Meale, E. J., "Coherent Control of Photocurrents in Graphene and Carbon Nanotubes", *Physical Review B*, p. 61(2000). Also, a current can be generated in a nanotube by injecting carriers into the nanotube from a set of contacts.

SUMMARY OF THE INVENTION

The various exemplary embodiments of the method and apparatus according to this invention uses light beams to create a current in at least one nanotube in an array of nanotubes. The concepts introduced by this invention helps to bridge the gap between the macroscopic scale and the mesoscopic scale in that it presents a useful alternative to fabricating contacts to the nanotubes which can be easily used by macroscopic devices. The macroscopic device can convert electronic information to light, which can then be used to communicate with the mesoscopic world.

According to one embodiment of the invention, a nanotube assembly has a plurality of nanotubes arranged in an array. An optical excitation device is provided adjacent to the nanotube assembly. The optical excitation device illuminates at least one of the plurality of nanotubes such that electrons are emitted from the at least one nanotube.

According to another aspect of this invention, the optical excitation device includes a diffraction grating and a piezoelectric crystal disposed adjacent to the diffraction grating. A radiation source generates a write beam incident to the piezoelectric crystal, a read beam incident to the diffraction grating, and an erase beam incident to the diffraction grating. When voltage is applied to the piezoelectric crystal, the write beam scans across the diffraction grating and forms a grating pattern in the diffraction grating. The read beam reads the grating pattern as a holographic image on the at least one nanotube. The erase beam erases the grating pattern.

According to another aspect of this invention, the diffraction grating includes a first layer, the first layer being provided with a plurality of injection elements. The diffraction grating also includes a second layer provided over the first layer, the second layer being provided with a plurality of scattering elements. The first layer and the second layer are made of semiconductor material. The image injecting elements are made of doped n-type semiconductor material and the scattering elements are made of heavily doped p-type semiconductor material.

According to another aspect of this invention, the plurality of injecting elements have an electronic band gap greater than the photon energy of the read beam such that the injection elements are transparent to the read beam.

According to another aspect of this invention, the plurality of scattering elements have an electronic band gap less than or equal to the photon energy of the read beam such that the scattering elements are opaque to the read beam.

According to another aspect of this invention, the first layer and the second layer have an electronic band gap greater than the photon energy of the read beam such that the first layer and the second layer are transparent to the read beam.

According to another aspect of this invention, the injecting elements have an electronic band gap less than the photon energy of the write beam such that the injecting elements are opaque to the write beam.

Other embodiments provide a method of displaying an image, including illuminating at least one of a plurality of nanotubes arranged in an array of nanotubes such that electrons are emitted from the at least one nanotube. The various exemplary embodiments of the methods according to this invention includes generating a write beam incident to a piezoelectric crystal and a read beam incident to a diffraction grating such that, when voltage is applied to the piezoelectric crystal, the write beam scans across the diffraction grating and forms a grating pattern in the diffraction grating and the read beam reads the grating pattern as a holographic image on the at least one nanotube.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

Figure 1:
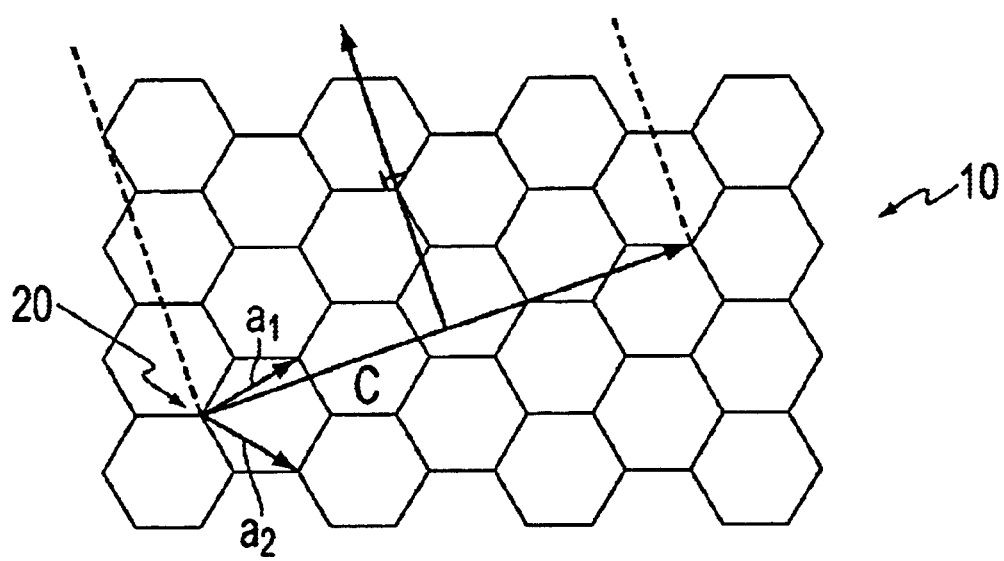
FIG. 1 shows a segment of a graphene sheet.
Figure 2:
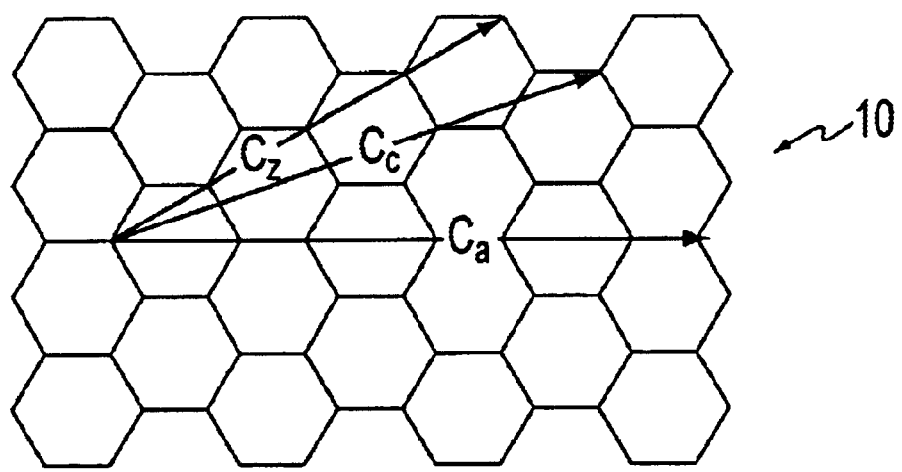
FIG. 2 shows the relationship between armchair, zigzag and chiral nanotubes.
Figure 3:
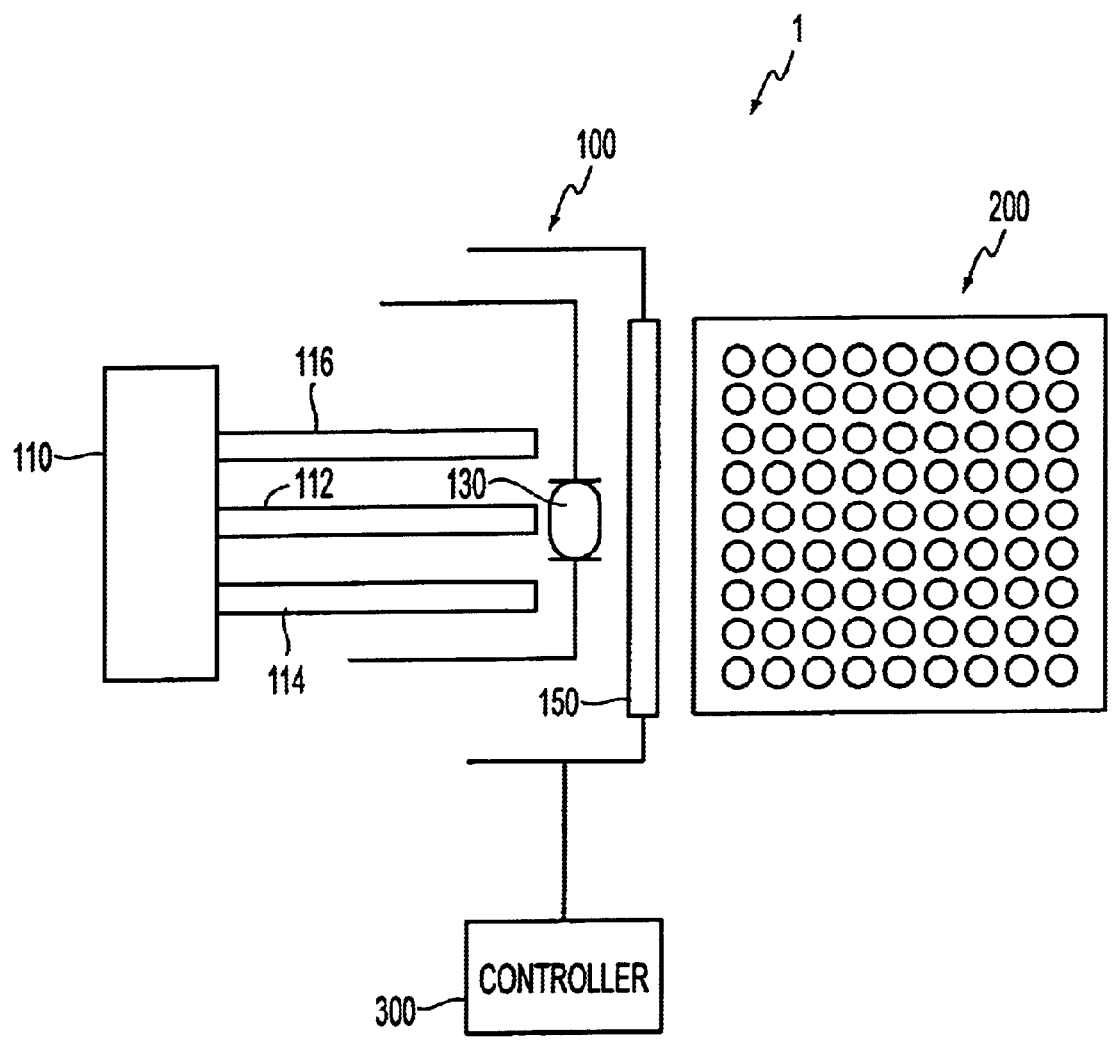
FIG. 3 shows an embodiment of an image display apparatus according to this invention.

FIG. 3 shows an embodiment of an image display apparatus according to this invention. The image display apparatus 1 includes an optical excitation system 100, a nanotube assembly 200 and a controller 300. The optical excitation system 100 includes a radiation source 110, a piezoelectric crystal 130, and a rewritable diffraction grating 150. As explained in further detail below, the rewritable diffraction grating 150 is used to create a holographic image on the nanotube array 200.

Figure 4:
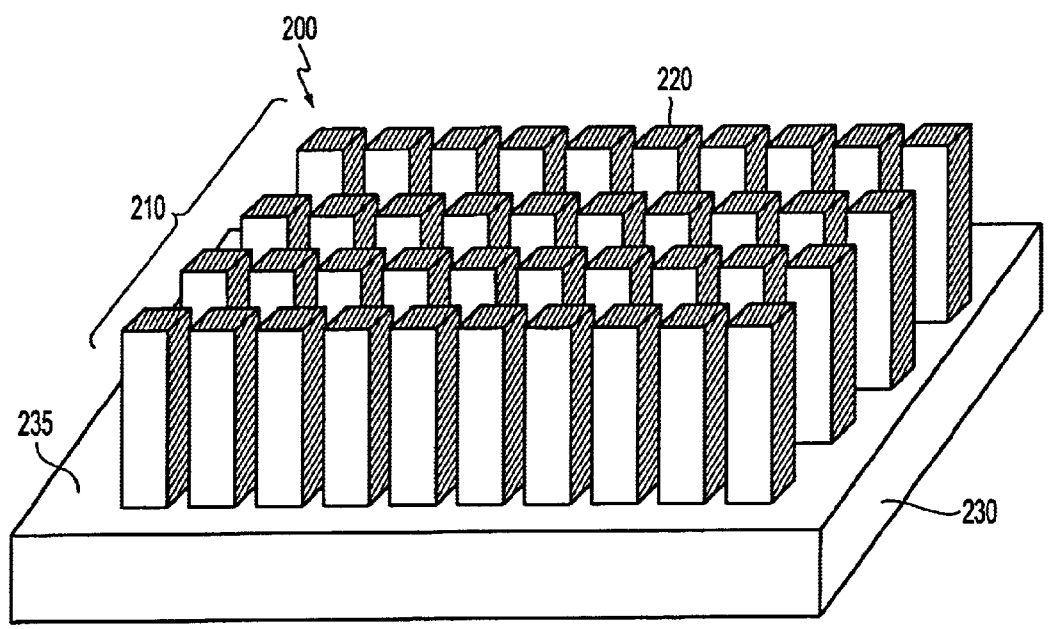
FIG. 4 shows a nanotube assembly according to this invention.

FIG. 4 shows the nanotube assembly 200. The nanotube assembly 200 includes an array 210 of segregated groups 220 of nanotubes arranged on a substrate 230. The long axis of each segregated group 220 of nanotubes is arranged perpendicular to the upper surface 235 of the substrate 230. It should be appreciated that the nanotube assembly shown in FIG. 4 is not meant to be limiting, and any variation of nanotube array or matrix can be used with the various exemplary embodiments of the methods and apparatus according to this invention. For example, although each segregated group 220 of nanotubes includes several nanotubes, it should be appreciated that single nanotubes can make up the array 210 rather than the segregated groups 220. Further, the array 210 of nanotubes can be of various length, width and height and can be of any number of carbon nanotubes desired. Also, the carbon nanotubes can be any distance apart, from closely spaced nanotubes wherein adjacent tube walls are touching to widely spaced nanotubes wherein adjacent nanotubes are several diameters apart. In addition, the nanotube array 210 may contain one type or many types of nanotubes, such as, for example, single walled or multi-walled nanotubes. Further, the nanotubes may have any type of conductive property possible, such as, for example, "armchair", "zigzag" or "chiral".

Figure 5:
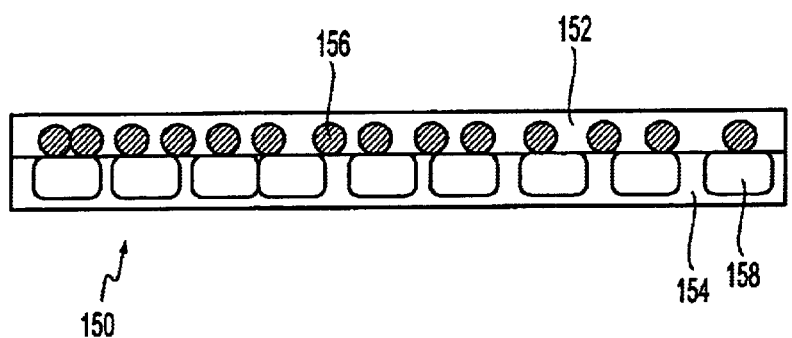
FIG. 5 shows an embodiment of the rewritable diffraction grating usable with the image display system according to this invention.

FIG. 5 shows an embodiment of the rewritable diffraction grating 150 usable with the image display system according to this invention. The rewritable diffraction grating 150 includes a first layer 152. A second layer 154 is formed over the first layer 152. The first layer 152 and the second layer 154 can be made of any suitable semiconductor material, such as, for example, ZnS or GaP, or any other related semiconducting material having similar properties. A plurality of injection elements 156 are embedded in the first layer 152. The injection elements 156 can be made of any suitable heavily doped n-type semiconductor material, such as, for example, GaSe, or any other related semiconducting material having n-type doping and similar properties. A plurality of scattering elements 158 are embedded in the second layer 154. The scattering elements 158 can be made of any suitable heavily p-doped semiconductor material, such as, for example, Si, or any other related semiconducting material having p-type doping and similar properties.

The controller 300 controls the radiation source 110 to generate a write beam 112, a read beam 114 and an erase beam 116. The radiation source 110 can be any known or later discovered radiation source that generates a directed beam of energy, such as, for example, a diode laser. The write beam 112 is directed incident to the piezoelectric crystal 130. The read beam 114 and the erase beam 116 are directed incident to the diffraction grating 150. The write beam 112, the read beam 114 and the erase beam 116 have different respective wavelengths.

The materials used for the first layer 152 and the second layer 154, the injection elements 156 and the scattering elements 158 have different electronic band gaps. The material used for the first layer 152 and the second layer 154 has an electronic band gap that is greater than the photon energy of the read beam 114 so that the first layer 152 and the second layer 154 are transparent to the read beam 114. The material used for the injection elements 156 has an electronic band gap that is greater than the photon energy of the read beam 114 and less than the photon energy of the write beam 112 so that the injection elements 156 are transparent to the read beam 114 and opaque to the write beam 112. The material used for the scattering elements 158 has an electronic band gap that is greater than the photon energy of the read beam 114 so that the scattering elements 158 are transparent to the read beam 114 when depleted of electrons, but can become opaque to the read beam 114 when electrons are introduced into the scattering elements 158

The write beam 112 generated by the radiation source 110 is refracted through the piezoelectric crystal 130. Voltage can be applied to the piezoelectric crystal 130 to change the index of refraction of the piezoelectric crystal 130 nonlinearly. As the index of refraction of the piezoelectric crystal 130 changes nonlinearly, the write beam 112 is refracted through the piezoelectric crystal 130 and scans across first layer 152 of the diffraction grating 150. The write beam 130 writes a grating pattern into the diffraction grating 150. Specifically, when the injection elements 156 are illuminated by the write beam 112, electrons move from the valence band of the injection elements 156 into the first layer 152, across the junction between the first layer 152 and the second layer 154, and into the scattering elements 158. Because the scattering elements 158 are positively charged acceptor centers made of heavily doped p-type semiconductor material, the scattering elements 158 readily accept the electrons. The width of the scanning write beam 112 determines the localization of the electron movement, which determines the resolution of the diffraction pattern. The locations at which the write beam 112 illuminates the diffraction grating 150 as the write beam 112 scans across the diffraction grating 150 determines which scattering elements 158 are made opaque to the read beam 114, thereby forming a grating pattern in the diffraction grating 150.

Figure 6:
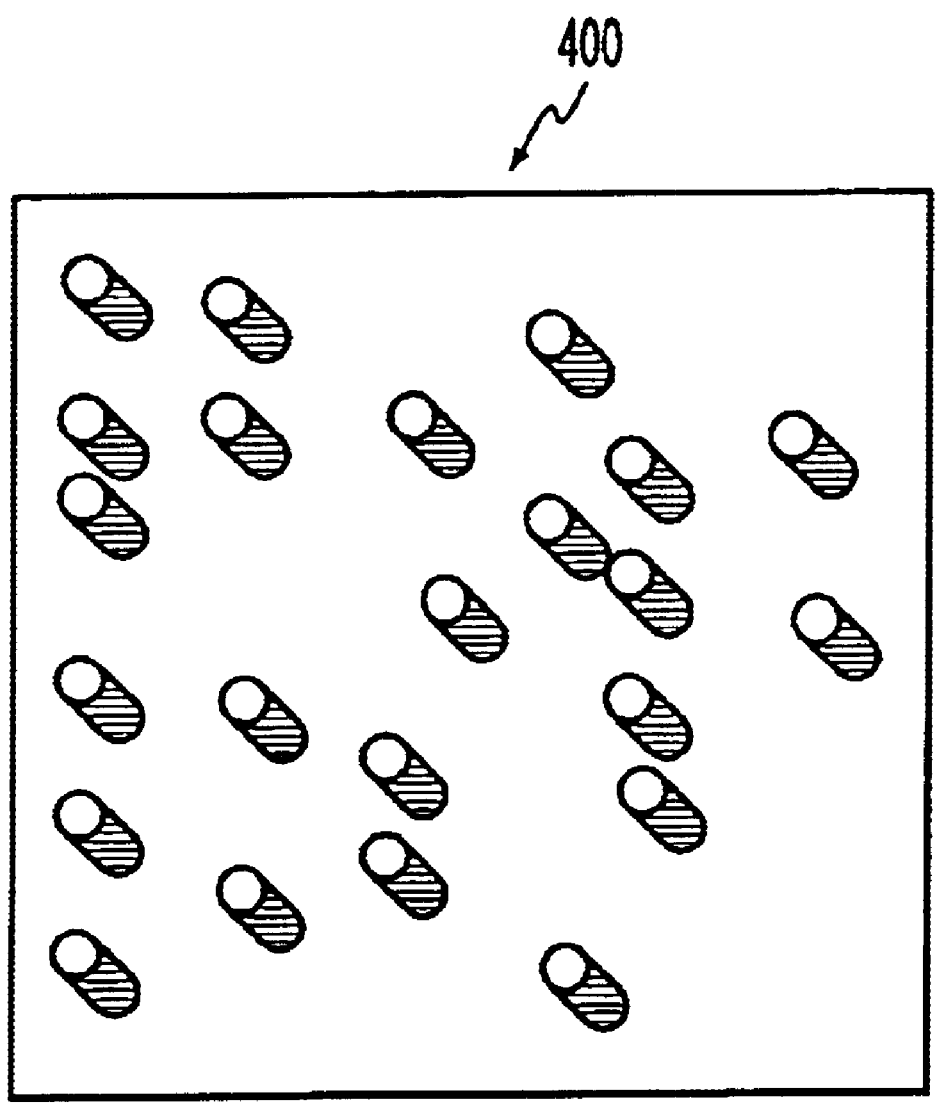
FIG. 6 shows an example of a holographic image generated by the diffraction grating according to this invention.

The grating pattern can be calculated based on the specific holographic pattern required on the nanotube array 200. This requires calculating the phase difference between a virtual reference beam and a virtual object beam. In this case, the object would be the holographic image, generated by the diffraction grating, to be superimposed on the nanotube array 200. FIG. 6 shows an example of such a holographic image. Only the excited nanotubes are visible in the holographic image 400.

A mathematical model can be used in which the nanotubes can be represented as transparent gaussians, which makes the calculation relatively simple. The model can then be illuminated from behind to produce a virtual object wave. The virtual object wave is then made to interfere with the virtual reference wave. This reference wave can be a plane wave having an arbitrary constant phase value. The difference in phase between the reference and object waves as a function of position, which determines the fringe pattern, is given by the following equation:

$$\phi(x, y) = \sum_i e^{-k^2((x-x_i)^2 + (y-y_i)^2)} \quad (2)$$

where:
(x$_i$, y$_i$) is the coordinate of the i-th point in the virtual array; and
k is the wavevector of the reference beam, which is equivalent to 1/$\lambda$, where $\lambda$ is the wavelength of the reference beam.

The diffraction pattern is proportional to cos($\phi$).

After the write beam 112 forms a grating pattern in the diffraction grating 150, the controller 300 controls the radiation source 110 to generate a read beam 114. The read beam 114 illuminates the diffraction grating 150 and passes through the scattering elements 158 that make up the grating pattern in the diffraction grating 150, thereby forming a holographic image superimposed on the nanotube array 200.

After the read beam 114 forms a holographic image superimposed on the nanotube array 200, the controller 300 controls the radiation source 110 to generate an erase beam 116. The erase beam 116 illuminates the diffraction grating 150 and moves electrons in the scattering elements 158 into the conduction band of the second layer 154. The second layer 154 is then connected to ground to drain electrons from the scattering elements 158, thereby erasing the grating pattern.

It should be understood that the configuration of the image display system according to this invention shown in FIG. 3 is not meant to be limiting, and any number and configuration of optical excitation systems and nanotube arrays as described herein can be used in conjunction to form the image display apparatus according to this invention. For example, in other embodiments, several optical excitation systems can be provided around a single nanotube array. The optical excitation systems can be synchronized to enhance the resolution of the produced image.

What is claimed is:
1. An image display apparatus, comprising:
    a nanotube assembly having a plurality of nanotubes arranged in an array; and
    at least one optical excitation device provided adjacent to the nanotube assembly and that illuminates at least one of the plurality of nanotubes such that electrons are emitted from the at least one nanotube, wherein the at least one optical excitation device includes:
        a diffraction grating;
        a piezoelectric crystal disposed adjacent to the diffraction grating; and
        a radiation source that generates a write beam, a read beam, and an erase beam.
2. The image display apparatus of claim 1, the diffraction grating comprising:
    a first layer, the first layer being provided with a plurality of injection elements; and
    a second layer provided over the first layer, the second layer being provided with a plurality of scattering elements.
3. The image display apparatus of claim 2, wherein the first layer and the second layer are made of semiconductor material.
4. The image display apparatus of claim 2, wherein the injecting elements are made of heavily doped n-type semiconductor material.
5. The image display apparatus of claim 2, wherein the scattering elements are made of heavily doped p-type semiconductor material.

6. The image display apparatus of claim 2, wherein the plurality of injecting elements have an electronic band gap greater than the photon energy of the read beam such that the injection elements are transparent to the read beam.

7. The image display apparatus of claim 2, wherein the plurality of scattering elements have an electronic band gap greater than the photon energy of the read beam such that the scattering elements are transparent to the read beam when the scattering elements are depleted of electrons, and become opaque to the read beam when electrons are introduced into the scattering elements.

8. The image display apparatus of claim 2, wherein the first layer and the second layer have an electronic band gap greater than the photon energy of the read beam such that the first layer and the second layer are transparent to the read beam.

9. The image display apparatus of claim 2, wherein the injecting elements have an electronic band gap less than the photon energy of the write beam such that the injecting elements are opaque to the write beam.

10. The image display apparatus of claim 1, wherein the write beam is incident to the piezoelectric crystal, the read beam is incident to the diffraction grating, and the erase beam is in incident to the diffracting grating, such that, when voltage is applied to the piezoelectric cyrstal, the write beams scans across the diffraction grating and forms a grating pattern in the diffraction grating, the read beam reads the grating pattern as a holographic image on the at least one nanotube, and the erase beam erases the grating pattern.

11. A method of displaying an image, comprising:
illuminating at least one of a plurality of nanotubes arranged in an array of nanotubes such that electrons are emitted from the at least one nanotube, wherein the step of illuminating includes, generating a write beam incident to a piezoelectric crystal and a read beam incident to a diffraction grating, when voltage is applied to the piezoelectric crystal, the write beam scans across the diffraction grating and forms a grating pattern in the diffraction grating and the read beam reads the grating pattern as a holographic image on the at least one nanotube.

12. The method of displaying the image of claim 11, wherein the diffraction grating comprises a first layer, the first layer being provided with a plurality of injection elements, and a second layer provided over the first layer, the second layer being provided with a plurality of scattering elements.

13. The method of displaying the image of claim 12, further comprising generating an erase beam incident to the diffraction grating such that in the scattering elements are moved into a conduction band of the second layer.

14. The method of displaying the image of claim 12, further comprising connecting the second layer to electrical ground such that electrons are drained from the scattering elements and the grating pattern is erased.

15. The method of displaying the image of claim 12, wherein the first layer and the second layer are made of semiconductor material.

16. The method of displaying the image of claim 12, wherein the injecting elements are made of heavily doped n-type semiconductor material.

17. The method of displaying an-the image of claim 12, wherein the scattering elements are made of heavily doped p-type semiconductor material.

18. The method of displaying the image of claim 11, wherein when voltage is applied to the piezoelectric crystal, the write beam scans across the diffraction grating and forms a grating pattern in the diffraction grating and the read beam reads the grating pattern as a holographic image on the at least one nanotube.

* * * * *